United States Patent [19]

Rauffer

[11] 4,317,619
[45] Mar. 2, 1982

[54] MICROFICHE APPARATUS

[75] Inventor: Walter Rauffer, Munich, Fed. Rep. of Germany

[73] Assignee: Agfa-Gevaert Aktiengesellschaft, Leverkusen, Fed. Rep. of Germany

[21] Appl. No.: 150,993

[22] Filed: May 19, 1980

[30] Foreign Application Priority Data

May 25, 1979 [DE] Fed. Rep. of Germany ....... 2921154

[51] Int. Cl.³ .............................................. G03B 23/04
[52] U.S. Cl. ..................................... 353/25; 353/116; 353/118
[58] Field of Search ............... 353/114, 118, 25, 27 R, 353/27 A, 103, 116, 117, 120, 122, 121; 206/316; 312/183, 186, 197, 59

[56] References Cited

U.S. PATENT DOCUMENTS

| | | | |
|---|---|---|---|
| 3,055,522 | 9/1962 | Cronquist | 353/25 X |
| 3,747,754 | 7/1973 | Nix | 312/197 X |
| 3,800,942 | 4/1974 | Hirata et al. | 353/25 X |
| 3,870,408 | 3/1975 | Kirr | 353/117 X |

*Primary Examiner*—Harry N. Haroian
*Attorney, Agent, or Firm*—Michael J. Striker

[57] ABSTRACT

A microfiche reader and/or enlarger has a housing provided with an opening. The microfiches are stored in hard-cover files having a pair of covers between which a series of pockets is located, with the individual pockets being connected to one another and the two end pockets each being connected to one of the covers. When the covers are moved from parallel to coplanar position the pockets assume a fan-shaped outline; when the file is attached to the opening in this position with the pockets projecting into the housing, inner open ends of the pockets are accessible to a gripper on a pivot arm which can be moved opposite any selected one of the open ends. The gripper can then extract the microfiche from the selected pocket and subsequently reinsert it thereinto.

9 Claims, 4 Drawing Figures

MICROFICHE APPARATUS

BACKGROUND OF THE INVENTION

This invention relates to a microfiche apparatus in general, and more particularly to a microfiche reader and/or enlarger.

Devices of this general description are known in a variety of types; they all perform their intended functions more or less satisfactorily. However, they are also relatively complicated which, in turn, makes them expensive. In many applications, however, the requirements are such that neither the complexity nor the expense are warranted; absent a viable alternative to these prior-art devices the use of microfiches is therefore precluded for such applications.

SUMMARY OF THE INVENTION

It is, accordingly, an object of the present invention to provide an apparatus of the type under discussion, which is of simple construction and inexpensive.

Another object is to provide such an apparatus which is easy to operate and permits simple handling and storage of the microfiches.

In keeping with these objects, and with still others which will become apparent hereafter, one aspect of the invention resides in a microfiche apparatus which, briefly stated, may comprise a microfiche file including a pair of stiff covers and a series of microfiche-storage pockets between the covers connected to each other, and the series also including two end pockets each connected to one of the covers, so that the series of pockets assumes a fan-shaped configuration when the covers are moved from a parallel position to a coplanar position; a housing having an opening through which the pockets are insertable into the housing in the thus-shaped configuration, so that inner open ends of the pockets face into the housing; and selecting means for withdrawing microfiches from, and restoring them to, the pockets through the inner open ends thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
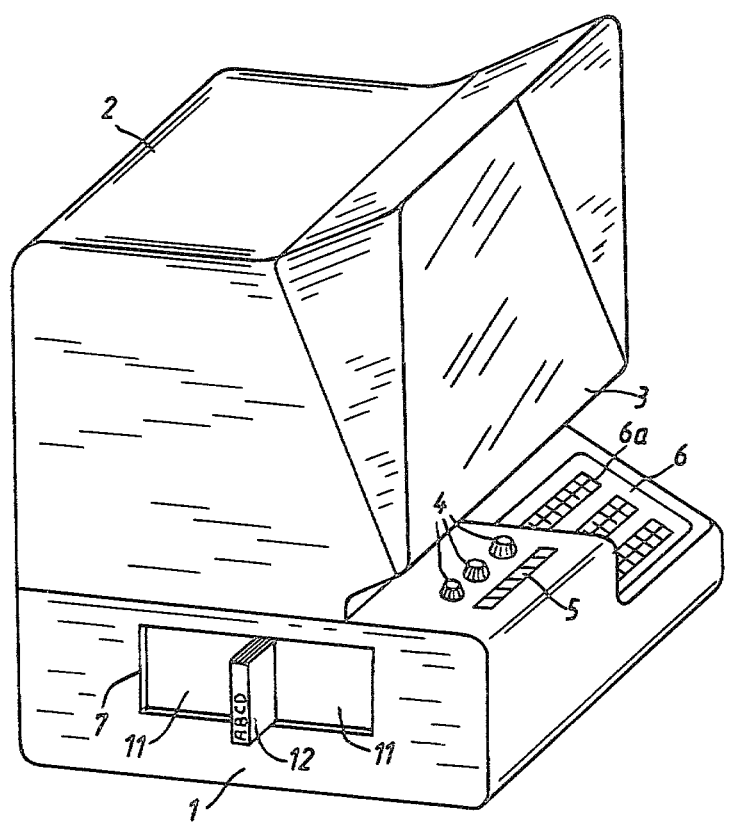
FIG. 1 is a perspective view, showing an apparatus according to the invention ready for use.

An exemplary embodiment of the apparatus according to the invention is illustrated in FIGS. 1-4. The apparatus has a lower housing component 1 (FIG. 1) and an upper housing component 2. The lower component houses an illuminating system, a selecting and positioning arrangement for microfiches, and a projecting device. To the extent that these elements are novel and/or necessary for an understanding of the invention, they will be discussed later on herein; to the extent that they are not discussed, they are known per se. The same applies to a series of deflection mirrors in the upper component 2, which direct the projected image onto a projection screen 3. One side, usually the front, of the lower component 1 is provided with function control knobs 4 for focussing, brightness control and image rotating prism and with a display unit 5 showing the code of the selected microfiche frame; such elements and their operation are known per se. Also provided at this side is a panel 6 with three keyboards 6a for selection of the desired microfiche, the selection of the desired column on the microfiche and the selection of the desired row on the microfilm, respectively. The keys of the keyboards are depressed by an operator in accordance with the storage code of a microfiche and film frame thereof which it is desired to project; this is also known per se.

Figure 4:
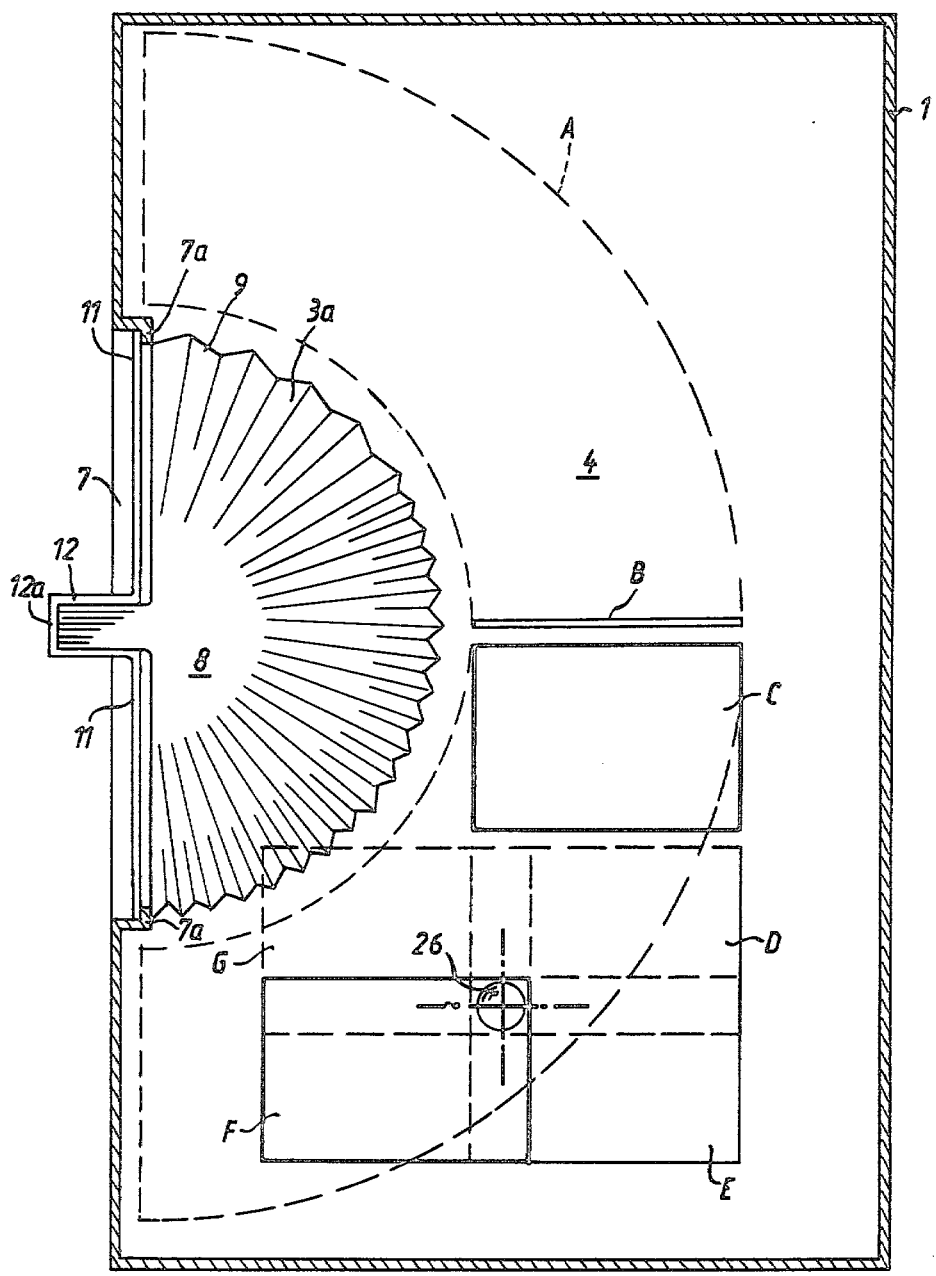
FIG. 4 is a horizontal section through the apparatus illustrated in FIG. 1.

One of the sides (preferably a lateral one) of the component 1 is provided with a rectangular opening 7 at which a microfiche storage file 8 (FIGS. 2, 4) is connectable to the apparatus. The storage file 8 has covers 11 of stiff cardboard or the like. Bound between these covers is a series of pockets or envelopes of paper or synthetic plastic foil. At the back 12 of the file 8 the pockets 9 and covers 11 are fixedly connected (e.g., by stapling, adhesive or the like); the front parts of the covers 11 can be swung open in the manner of a book and the pockets 9 (which are seriatim connected to each other with the two end pockets being connected to the respective covers) are then pulled apart in harmonica fashion (FIG. 4). Each pocket 9 accommodates one microfiche. The depth of the back 12 is preferably relatively deep so that the file can be securely gripped by it. The rear edge 12a can carry information regarding the contents of the file.

The covers 11 are slightly larger than the pockets 9 and the opening 7 is circumferentially bounded by a lip 7a which reduces its size to a dimension slightly smaller than the combined dimensions of the covers 11 in the open condition of the file (as shown in FIG. 4). The resulting dimension of opening 7 is large enough to permit the pockets 9 to enter freely through the opening into the apparatus. When the file is installed on the apparatus, the edges of the covers 11 engage the lip 7a to form a lightseal therewith. Appropriate means (not shown) are provided to hold the file 8 on the apparatus in the FIG. 4 position; these may be spring clamps, guide rails or the like and can be in any form known per se for such retaining purposes.

Figure 2:
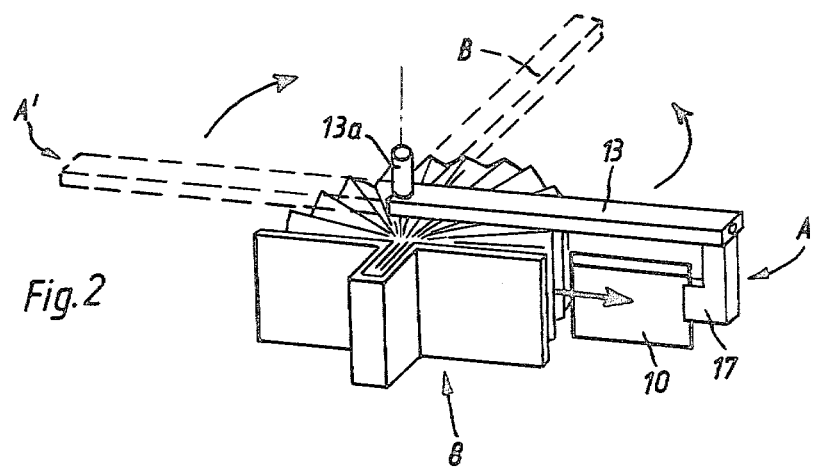
FIG. 2 is a perspective view, showing the microfiche selecting arrangement of the apparatus in FIG. 1.
Figure 3:
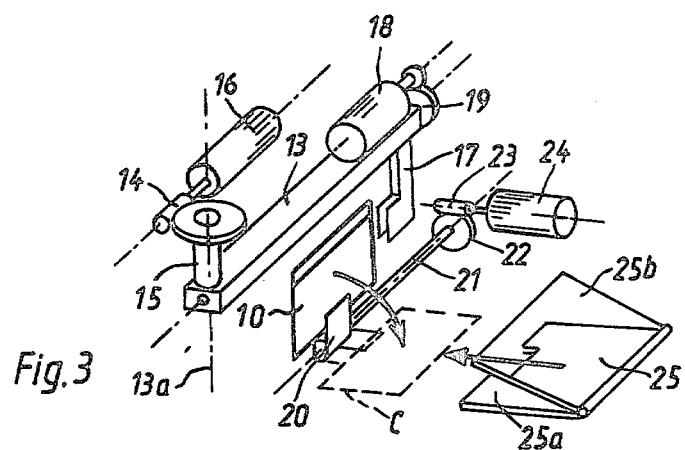
FIG. 3 is another perspective view, illustrating the microfiche selecting, transporting and positioning components of the apparatus in FIG. 1.

Mounted in the interior of the housing 1, 2 is an arm 13 which is pivotable about an axis 13a from either of the microfiche retrieving or returning positions A, A' to the microfiche transfer position B (FIGS. 2, 3). Pivoting of the arm 13 is effected via a worm drive 14, 15 (FIG. 3) which is powered by electric motor 16. A magnetic gripper 17 is carried by and shiftable lengthwise of the arm 13 by means of a drive 18, 19 (e.g. another motor and worm drive). The magnetic gripper comprises two magnetically attractive jaws normally closed. For opening of the jaws, a wedge-shaped opening element operated by means of a magnetic coil is introduced between the two jaws pressing the jaws apart. The previously mentioned selecting and control means in the housing can be utilized by an operator to position the free end (i.e. the end remote from axis 13a) of arm 13 opposite the open end of any desired one of the pockets 9. To retrieve the microfiche contained in the particular pocket 9, the gripper 17 is made to move lengthwise of the arm towards the axis 13a, so as to enter into the pocket 9 until the microfiche 10 therein is located between the two flat sheet-material jaws of the gripper 17. The magnetic gripper is now closed, i.e. the jaws move together and clamp the microfiche between them, and the direction of rotation of motor 18 is reversed. This causes gripper 17 with microfiche 10 to move back to the free end of arm 13; upon arrival at this free end the microfiche 10 has been completely extracted from its pocket 9.

The arm 13 with the extracted microfiche 10 is now pivoted to position B via the drive 14–16. In this position the lower edge portion of the microfiche is embraced and gripped by another magnetic gripper 20 which is mounted on a shaft 21 that can be driven by a motor 24 via a worm drive 22, 23. By operation of this drive the microfiche 10, now disengaged by the gripper 17, is tilted from its vertical position to a horizontal position which is designated with reference character C in FIGS. 3 and 4. Now a film holder (or better, a fiche holder) 25 composed in known-per-se manner of two transparent plates 25a, 25b, is moved towards the microfiche 10; during this movement the upper plate 25a is moved apart from plate 25b as shown in FIG. 3 (e.g. by use of an inclined ramp, wedge or cam or in the manner shown in FIG. 7 of German Offenlegungsschrift No. 27 14 165) so that when the holder 25 reaches its take-over position, the microfiche is located between the plates 25a, 25b. The gripper 20 is now deactivated to release the microfiche 10 which then rests freely on the lower plate 25a. During retraction of the holder 25 the upper plate 25b moves down upon the plate 25c and the microfiche 10 on the same.

Thus held, the microfiche is transported by holder 25 to the projecting position in which they are both located below a projection lens 26. Since a microfiche has a series of individual film frames on it, the holder 25 can be made to move by a motor-powered coordinate drive (known per se) to any of the end positions D-G1, in a plane normal to the optical axis of the lens 26. This permits a user to select any of the various film frames on the microfiche 10.

When the microfiche is to be returned to its associated pocket 9, the operations outlined above are again carried out, but in reverse.

It will be seen that the device according to the invention meets the objects outlined earlier. The file with the microfiches can be readily stored, individually or as part of a collection of such files (in which case it can be easily catalogued as to its contents). When needed, the file is manually placed in the machine, while opening up its pocket 9.

The file is readily accessible, the microfiches are easily extracted and returned to their pockets, well protected and quickly replacable with others.

While the invention has been illustrated and described as embodied in a microfiche apparatus, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a microfiche apparatus, a combination comprising a microfiche file including a pair of stiff covers and extensible and collapsible means forming a series of microfiche storage pockets between said covers and connected to each other, said series also including two end pockets each connected to one of said covers, said covers and said pockets being turnable between a file closed position in which said covers are parallel to one another and said pockets are collapsed, and a file open position in which said covers are coplanar and said pockets are extended and assume a fan-shaped configuration; a housing having an opening through which said pockets are insertable into said housing in said fan-shaped configuration so that the inner open ends of said pockets face into the housing; and selecting means for withdrawing microfiches from, and restoring them to, said pockets through said inner open ends thereof.

2. A combination as defined in claim 1, wherein said microfiche file has an axis, said pockets extending to said axis and being arranged so as to turn relative to one another during their turning between said positions.

3. A combination as defined in claim 1, wherein each of said pockets has a pocket axis extending through said axis of said microfiche file.

4. A combination as defined in claim 1, wherein in said open position said covers extend in a predetermined plane and said pockets extending forwardly beyond said plane, said microfiche file having a rear portion which in said open position extends rearwardly beyond said plane to be gripped by a user for inserting said pockets into said housing.

5. A combination as defined in claim 1, wherein the said opening is smaller than the combined area of said covers in the coplanar position thereof.

6. A combination as defined in claim 5; and means surrounding said opening and engaging said covers in the coplanar position thereof, to provide a light-seal with said covers.

7. A combination as defined in claim 1, said selecting means comprising a pivotable gripping arm having an end portion movable along said fan-shaped configuration and positionable opposite the respective inner open ends of said pockets.

8. A combination as defined in claim 7; said selecting means further comprising gripping means on said arm for selectively withdrawing microfiches from, and restoring them to, said pockets.

9. A combination as defined in claim 8, said gripping means comprising a gripping element movable lengthwise of said arm, and a drive for effecting such movement.

* * * * *